INVENTOR
Henry J. Riblet

April 23, 1957        H. J. RIBLET        2,790,151
TEMPERATURE COMPENSATED CAVITY RESONATOR
Filed Jan. 5, 1952        2 Sheets-Sheet 2

INVENTOR
Henry J. Riblet

United States Patent Office 2,790,151
Patented Apr. 23, 1957

2,790,151

TEMPERATURE COMPENSATED CAVITY RESONATOR

Henry J. Riblet, Wellesley, Mass.

Application January 5, 1952, Serial No. 265,140

2 Claims. (Cl. 333—83)

The present invention relates in general to tunable frequency determining means of the cavity type, and in particular to frequency meters as well as to coaxial cavities used with tunable signal generators.

It is the object of the present invention to provide a tunable frequency determining means of the cavity type in which the frequency determined by the cavity is very insensitive to temperature changes for all frequency settings.

It is still another object to provide such a tunable frequency determining cavity wherein the structural requirements to provide broad band temperature compensation are easily arrived at and simple to satisfy.

To provide the foregoing and other advantages, the invention contemplates the provision in a cylindrical frequency determining cavity, which may be either hollow or of the coaxial type, of a movable end member which is constrained from free rotation. The axial motion of the movable end member is determined by a combination nut and bolt member which is threaded internally to form a nut which engages a suitably threaded extension of the movable end wall and is threaded externally to form a bolt which is engaged by a suitably threaded extension of the fixed exterior portion of the cavity. The temperature compensating characteristics of the frequency meter are obtained by the choice of threads on the combined nut and bolt member and by the choice of linear coefficients of expansion of its component parts. In general, these latter will be appreciably greater than the effective linear coefficient of expansion of the remainder of the frequency determining cavity.

Other and further objects of the invention will become apparent from the description of certain embodiments thereof that follows, reference beng made to the accompany drawings, wherein.

versus L which will be useful in explaining the operation of my invention.

Figure 6:
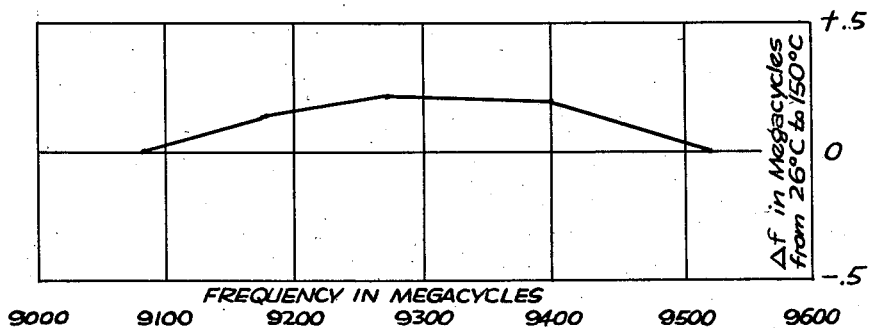

Figure 6 shows data obtained with an experimental frequency determining cavity.

Figure 1:
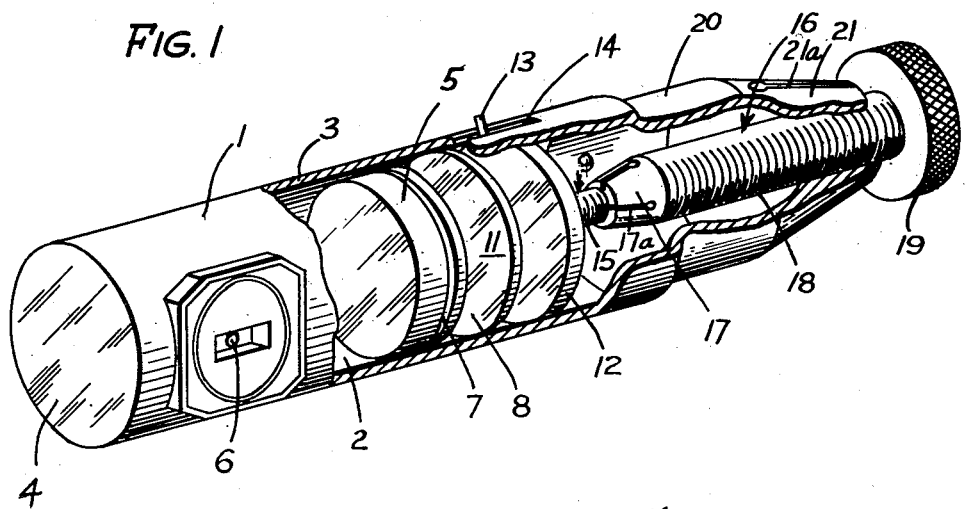
Figure 1 shows an isometric view partly broken away of a tunable frequency determining cavity which is temperature compensated over a broad band of frequencies.
Figure 2:
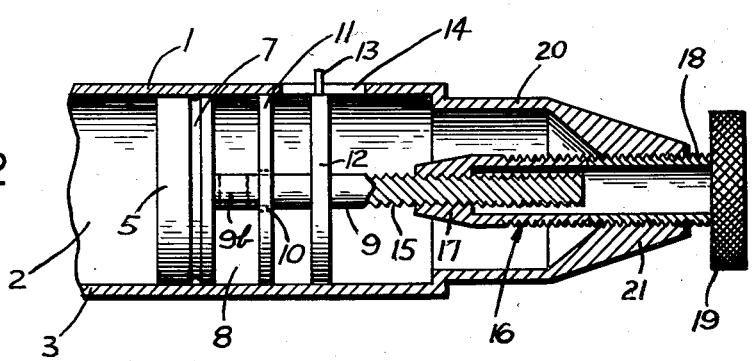
Figure 2 shows a cut-away side view of the temperature compensating machine.
Figure 4:
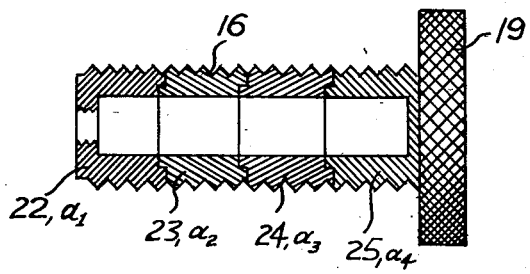
Figure 4 shows a cross section view of the combined nut and bolt member.

Figure 1 shows a temperature compensated frequency determining cavity 1 consisting of a cylindrical resonating space 2 bounded on its sides by a cylindrical shell 3, a fixed end wall 4, and a movable wall 5. A coupling aperture 6 is provided for transmission of energy from the outside to the inside of the cavity. Referring to Figure 2, the movable end plate 5 is provided with a choke groove 7 so that the R. F. energy does not excite the region 8 back of the movable end plate 5. The movable end plate 5 is rigidly attached to and supported by a drive shaft 9 which passes through a hole 10 in a fixed end plate 11 which is securely and rigidly attached to the cylindrical shell 3 of the frequency meter. Hole 10 is made a slide fit on drive shaft 9 so that it supplies a mechanical support for drive shaft 9 and serves to center the movable end wall 5 in the cylindrical shell 3. On the other side of the end wall 11, a circular plate 12 is rigidly attached to the drive shaft. To this circular plate, a dowel pin 13 is rigidly affixed. This pin 13 rides in a close fitting slot 14 which has been machined, not necessarily longitudinally, in shell 3 of the wavemeter. In this manner the movable end wall 5 is free to move longitudinally in the case but is constrained in its rotation relative to it. Alternately this form of constraint may be provided by a copper bellows which is soldered to the fixed end plate 11 and the movable plate 12. On the other side of the movable plate 12 the end of the drive shaft 9 is provided with a threaded end 15 having $n_1$ threads per inch. The threaded end 15 is engaged by a combined nut and bolt member 16. This nut and bolt member is constructed of a material, or of materials, as shown in Figure 4, whose coefficients of linear expansion are, in general, larger than those of the majority of the materials of the remainder of the frequency meter.

The nut portion 17 of the nut and bolt member 16 is split so that the portions of the nut may be prestressed to minimize back-lash. The exterior surface of the nut and bolt member 16 is provided with an exterior thread 18 having $n_2$ threads per inch. The end of the nut and bolt member 16 is provided with a knurled portion 19 to facilitate its rotation by hand. A fixed extension 20 of the shell 3 of the frequency meter is provided with a nut 21 which is internally threaded to engage the outer threads 18 of the nut and bolt member 16. Nut 21 is also split and prestressed to minimize back-lash. An arrangement for constructing the nut and bolt member 16 of materials of different linear coefficients of expansion is shown in Figure 4. Here the various portions 22, 23, 24 and 25 may be silver brazed together before assembly. As indicated these portions 22–25 have respectively the linear coefficients of expansion $\alpha_1$, $\alpha_2$, $\alpha_3$, $\alpha_4$. As will become clear from the discussion to follow, increasing the number of portions of the nut and bolt member 16 permits more and more accurate broad band compensation. For many applications, of course, a nut and bolt member of a single material will suffice.

It will be clear to one familiar with the art, that only a portion of the end wall 5 need be movable, and that the cylindrical cavity 2 could be of the coaxial type in which case the movable end wall 5 would ordinarily consist of an annular ring.

The adjustment of the length L of the cavity in order to change the resonant frequency then proceeds as follows. If we assume that both threads are right hand threads, clockwise rotations of the knurled knob 19 relative to the case 3 of the wave-meter advances the nut and bolt member at the rate of $1/n_2$" per turn. At the same time, if the movable end wall 5 and the drive shaft 9 are prevented from rotating by pin 13 riding in slot 14, the nut 17 advances on the threaded end portion 15 at the rate of $1/n_1$" per turn. Hence the net increase in L is given by $$\left(\frac{1}{n_1}-\frac{1}{n_2}\right)T$$

where T is the total number of turns imparted to the knurled knob 19.

As is well known to the art, the frequency at which such a cavity resonates is determined by the precise internal dimensions of the cavity and may be varied, for example, by altering the length of the cavity. Similarly changes in temperature also alter the dimensions of the cavity and change its resonant frequency.

The remainder of this specification explains those elements peculiar to this invention whereby temperature compensation is provided so that wide changes in temperature have little or no effect on the resonant frequency of the cavity regardless of the length L of the cavity, i. e. the particular resonant frequency in use. This will be done with the help of Figures 3 and 5. The resonant frequency of a cylindrical cavity is given in "Radar Systems and Components," Bell Laboratories Series, 1949, D. Van Nostrand Co., pp. 919 by the expression $(fD)^2 = A + Bn^2(D/L)^2$ where $f$=frequency in megacycles, $D$=diameter of the cavity in inches, $L$=length of cavity in inches, $A$=a constant depending on the mode, $B$=constant depending on the velocity of electromagnetic waves in the dielectric, and $n$ is the third index defining the mode, i. e., the number of half wavelengths along the cylinder axis. Since D and L are functions of the temperature (we shall assume that B is independent of temperature in order to simplify the discussion), this equation determines the dependence of $f$ on temperature. If we differentiate this equation with respect to $t$, the temperature, we find that the condition for perfect compensation $$\frac{\partial f}{\partial t} = 0$$

may be expressed:

$$\frac{\partial L}{\partial t} = -C \frac{L^3}{D^3} \frac{\partial D}{\partial t}$$

(The use of the partial differential symbol $\partial$ assumes that perfect compensation is desired over an infinitesimal temperature range. Over a finite temperature range the $\partial$ symbol may be replaced by the increment symbol $\Delta$ without altering the significance of the discussion to follow. Insofar as the behaviour of frequency with respect to temperature is linear the two symbols have the same meaning.) Here C is a positive constant depending on A, B and $n$. D is fixed and $$\frac{\partial D}{\partial t} = D\alpha$$

where $\alpha$ is the linear coefficient of expansion of the material of which the shell is made. It is clear that the required rate of change of L with respect to $t$ is negative and a function of L itself. If B depends on $t$, a similar type of expression for $$\frac{\partial L}{\partial t}$$

will be obtained. In any case $$\frac{\partial L}{\partial t} = F(L)$$

Figure 5:
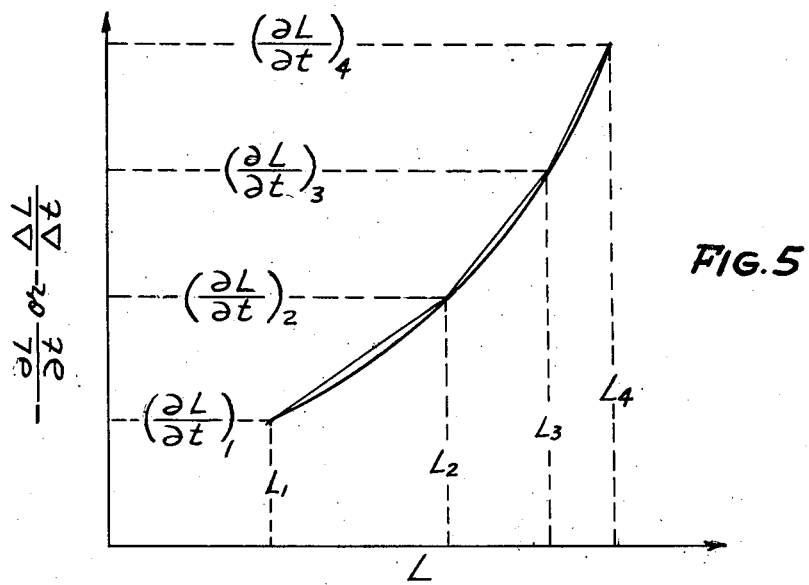
Figure 5 shows a curve of $$\frac{\partial L}{\partial t}$$

This generalized curve is plotted in Figure 5. It should be repeated that if we are interested in the frequency behaviour of the cavity between specified temperature limits $t_h$ and $t_c$, we consider $$\frac{\Delta L}{\Delta t} = F(L)$$

where $\Delta t = t_h - t_c$.

Needless to say, for some applications a theoretical curve will not be sufficiently accurate and it will be necessary to determine the ideal curve of $$\frac{\partial L}{\partial t}$$

experimentally. This, of course, is readily done by determining the values of L for which the cavity resonates at the same frequency for the two temperatures $t_h$ and $t_c$ and computing $$\frac{\Delta L}{\Delta t}$$

as a function of L, where $\Delta L = L_h - L_c$ and $\Delta t = t_h - t_c$. In the limit as $t_h \to t_c$, $$\frac{\Delta L}{\Delta t} \to \frac{\partial L}{\partial t}$$

To avoid needless repetition the symbol $$\frac{\partial L}{\partial t}$$

will be used interchangeably with $$\frac{\Delta L}{\Delta t}$$

and will be defined as the effective change in L divided by the effective change in temperature. In actual cases, numerical values are chosen to best serve my objective of obtaining broad band temperature compensation as desired. Similar remarks apply to the various possible meanings of the term "linear coefficient of expansion."

Figure 3:
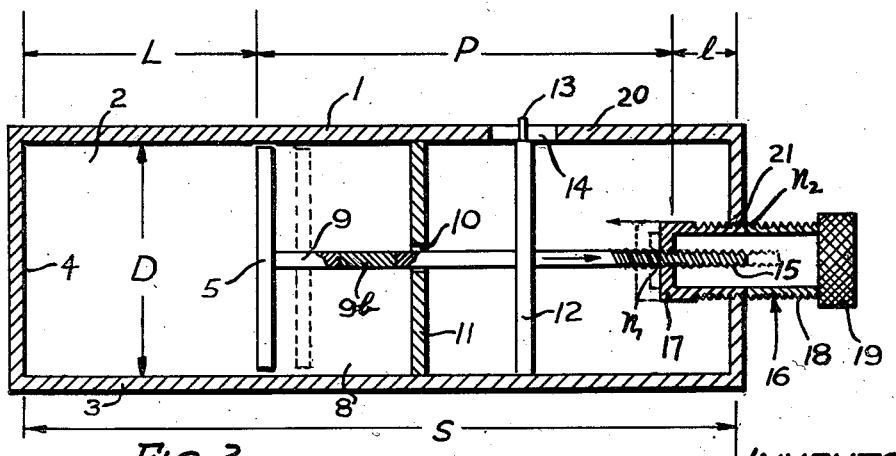
Figure 3 shows a schematic drawing which will be useful in explaining the operation of my invention.

The remainder of this specification shows how, with a frequency meter as shown in Figures 1–3, a $$\frac{\partial L}{\partial t}$$

characteristic can be obtained which approximates, with arbitrary accuracy, a prescribed F(L). It will simplify the discussion to assume for the time being that all parts of the frequency meter are made of the same material and have the same coefficient of linear expansion $\alpha$ except for the combined nut and bolt assembly 16 which is constructed of a series of different materials having coefficients of linear expansion $\alpha_1 \ldots \alpha_n$ proceeding from right to left. In the simplest case, I have constructed the shell 3, the movable end wall 5, the rigid drive shaft 9 and other parts of Invar, while the combined nut and bolt assembly 17 was made of Phosphor bronze.

Our problem is to select the parameters of the tunable frequency meter 1 so that the actual values of $$\frac{\partial L}{\partial t}$$

denoted by $$\left[\frac{\partial L}{\partial t}\right]$$

approximate as closely as possible the desired values of $$\left[\frac{\partial L}{\partial t}\right]$$

given by F(L). In general the function F(L) will be a continuous curve whereas values of $$\left[\frac{\partial L}{\partial t}\right]$$

will fall on straight lines as a consequence of the nature of the tuning mechanism. We shall see this from Figure 3, where $L = S - P - l$ so that $$\left[\frac{\partial L}{\partial t}\right] = \alpha L + (\alpha - \alpha_1)l \quad (1)$$

As shown in Figure 5, an excellent approximation will result if $$\left[\frac{\partial L}{\partial t}\right]$$

assumes the required values given by F(L) for a set of values of $L_1$, $L_2$, $L_3$, $L_4$, corresponding to selected frequency values $f_1, f_2, f_3, f_4$. It is clear that this will be accomplished if we can first choose $$\left[\frac{\partial L}{\partial t}\right]_1 = F(L_1)$$

for one value of L corresponding to $f_1$ and thereafter determine $$\left[\frac{\partial L}{\partial t}\right]_2 - \left[\frac{\partial L}{\partial t}\right]_1 = F(L_2) - F(L_1)$$

for a second value of L.

My invention shows how the second condition can be realized from one value of L to the next, step by step for as many values of L as required. Since $L_1$, $\alpha$ and $\alpha_1$ are fixed, Equation 1 allows me to prescribe the value of $$\left[\frac{\partial L}{\partial t}\right]_1$$

by properly selecting $l_1$. Now consider a second value of $L_1$, $L_2$, for which perfect compensation is required. From Figure 3, it is clear that to change L we must rotate the combined nut and bolt member 16. If L increases by $\Delta L$, P decreases by $\Delta P$ and $l$ increases by $\Delta l$. The threaded portion 15 of drive shaft 9 covered by the change has an effective coefficient of linear expansion which will be denoted by $\alpha$ while the portion of the combined nut and bolt member 16 uncovered in the change has an effective linear coefficient of expansion denoted by $\alpha_{\Delta l}$.

It will now be shown that $$\left[\frac{\partial L}{\partial t}\right]_2 - \left[\frac{\partial L}{\partial t}\right]_1 = \alpha_{\Delta P_1}\Delta P_1 - \alpha_{\Delta l_1}\Delta l_1$$

It is apparent that having satisfied this condition by the choice of $\alpha_{\Delta l_1}$ and by $l_1$ say, and thus having obtained $$\left[\frac{\partial L}{\partial t}\right]_2 = F(L_2)$$

we may proceed as before and by selecting $\alpha_{\Delta l_2}$ properly, determine $$\left[\frac{\partial L}{\partial t}\right]_3 = F(L_3)$$

and so on.

Suppose that $T^1$ turns of the nut and bolt assembly 16 are required to increase L from $L_1$ to $L_2$, where $L_2$ is the mean value of L at the next lowest frequency of perfect compensation. Then $$L_2 - L_1 = \Delta L_1 = \frac{T^1}{n_1} - \frac{T^1}{n_2} = \Delta P_1 - \Delta l_1$$

and $$\left[\frac{\partial L}{\partial t}\right]_2 = \alpha S_1 - \alpha P_1 + \alpha_{\Delta P_1}\Delta P_1 - \alpha l_1 - \alpha_{\Delta l_1}\Delta l_1 \quad (2)$$

From (1) and (2)

$$\left[\frac{\partial L}{\partial t}\right]_2 - \left[\frac{\partial L}{\partial t}\right]_1 = \alpha_{\Delta P_1}\Delta P_1 - \alpha_{\Delta l_1}\Delta l_1 \quad (3)$$

Proceeding exactly in the same manner one obtains $$\left[\frac{\partial L}{\partial t}\right]_3 - \left[\frac{\partial L}{\partial t}\right]_2 = \alpha_{\Delta P_2}\Delta P_2 - \alpha_{\Delta l_2}\Delta l_2 \quad (4)$$

If $$\alpha_{\Delta P_1} \text{ and } \alpha_{\Delta l_1}$$

are fixed, then, specifying the value of $$\left[\frac{\partial L}{\partial t}\right]_2 - \left[\frac{\partial L}{\partial t}\right]_1$$

is essentially a condition on $\Delta P_1/\Delta l_1$ or a condition on $n_2/n_1$.

Thus having obtained perfect compensation at $L_1$, we can obtain compensation at $L_2$ by proper choice of $n_1$ and $n_2$. These now are fixed and compensation at a third position $L_3$, requires a specified value $$\alpha_{\Delta l_2}$$

for the coefficient of linear expansion of the portion of the combined nut and bolt uncovered in the frequency change in going from $L_2$ to $L_3$. As shown in Figure 4

$$\alpha_{\Delta l_2} = \alpha_2$$

The condition for multiple temperature compensation may then be expressed on an iterative basis as follows: If $$\left[\frac{\partial L}{\partial t}\right]$$

assumes the value required for perfect temperature compensation at one frequency, the value of $$\left[\frac{\partial L}{\partial t}\right]$$

required for temperature compensation at a lower frequency may be achieved by selecting the turns ratio, $n_1/n_2$ and the coefficient of linear expansions of the combined nut and bolt member 16 and the threaded portion 15 of the drive shaft 9 so that the change in the required values of $$\frac{\partial L}{\partial t} = F(L)$$

is equal to the effective linear coefficient of expansion $\alpha_{\Delta P}$ of the threaded end portion uncovered in the frequency change, multiplied by the length uncovered, $\Delta P$, minus effective linear coefficient of expansion $\alpha_{\Delta l}$ of that portion of the portion of the combined nut and bolt member 16 multiplied by the length $\Delta l$ uncovered in the frequency change.

It is clear that the operation of my invention will not be altered in any way if the portion of the threaded end portion 15 uncovered in the frequency change has a different linear coefficient of expansion from $\alpha$ or if the materials comprising the shell 3 and the end wall 5 and drive shaft have differing linear coefficients of expansion. For example, Figures 2 and 3 show a piece of material 9b which is inserted in the drive shaft 9. In an actual case this was made of brass and had the effect of reducing the length $l_1$ required for perfect compensation at the highest frequency. It had no other effect on the operation of my invention.

Figure 6 shows the type of temperature compensation achieved with a frequency meter built in accordance with my invention. All parts of the device were constructed of Invar having a linear coefficient of expansion of $1.6 \times 10^{-6}$, except the combined nut and bolt member 16 which was made of Phosphor bronze having a linear coefficient of expansion of $16 \times 10^{-6}$. The drive shaft 9 was provided with 18 threads per inch while the bolt portion of the combined nut and bolt member had 46 threads per inch. It should be emphasized again that the same type of performance could be obtained with a coaxial cavity as a frequency meter or as a resonant circuit in a radio frequency signal generator.

It will be apparent to anyone skilled in the art that beginning with any frequency of perfect compensation that my invention may be used to obtain other frequencies of perfect compensation at both higher and lower frequencies.

Since numerous variations and applications within the scope of the invention will occur to those skilled in the art, it is intended that the appended claims shall be given a broad interpretation commensurate with their scope within the art.

The cavity in the form shown in the figures has been cylindrical but it is to be understood that the word cylindrical is intended to include other shapes, such as oval or polygonal without sharp corners or other regular shapes where one end wall or a section of an end wall may be adjusted.

In Figure 4 the nut and bolt member has sections showing materials of different linear coefficient of expansion. These sections may be of such metal as Invar, stainless steel, brass, Phosphor bronze or other alloys or compositions. The coefficient of linear expansion of invar ranges from $0.9$–$1.8 \times 10^{-6}$, stainless steel from $11$–$19 \times 10^{-6}$, brass approximately $19 \times 10^{-6}$ where the coefficient is given in increment of expansion per unit length per degree centigrade.

Having now described my invention, I claim:

1. A frequency determining cavity resonator comprising a generally hollow cylindrical conductive structure having a fixed end wall and an oppositely disposed axially adjustable non-rotatable confronting end wall, a first axial threaded member rigidly affixed to and extending outwardly of said adjustable end wall, a second threaded member coaxial with said first threaded member and arranged to threadably engage both a portion of said conductive structure and said first threaded member, said second threaded member being formed of a plurality of rigidly connected cylindrical segments of unequal temperature coefficient of expansion, said threaded members being arranged whereby the length of said first threaded member between said movable end wall and the point of engagement thereof with said second threaded member varies from minimum to maximum and whereby the number of said cylindrical segments between said last mentioned point of engagement and said portion of said conductive structure engaging said second threaded member varies between unity and all thereof as said axial spacing between said end walls varies from maximum to minimum, respectively.

2. Apparatus as in claim 1 wherein said second threaded member is formed of a plurality of axially disposed interlocked cylindrical segments of metallic elements of unequal temperature coefficients of expansion, the outer cylindrical surface of said interlocked segments being formed with a uniform continuous thread of second pitch, said conductive structure being formed with an opening having mating threads of second pitch for threadably engaging said surface of said interlocked segments, said first threaded member being formed with threads of first pitch and being engaged in an axial opening of said second threaded member, said last mentioned axial opening being formed with mating internal threads of said first pitch.

References Cited in the file of this patent

UNITED STATES PATENTS

| | | |
|---|---|---|
| 2,109,880 | Dow | Mar. 1, 1938 |
| 2,215,582 | Goldstine | Sept. 24, 1940 |
| 2,533,912 | Bels | Dec. 12, 1950 |
| 2,716,222 | Smullin | Aug. 23, 1955 |